Oct. 27, 1970   R. K. SOBERMAN   3,536,924
TRACKING DEVICE FOR MOVING WAVE ENERGY SOURCE TO OPTICAL
DETECTORS UTILIZED TO DETERMINE RANGE AND VECTOR
VELOCITY OF A MOVING WAVE ENERGY SOURCE
Filed Nov. 13 1967
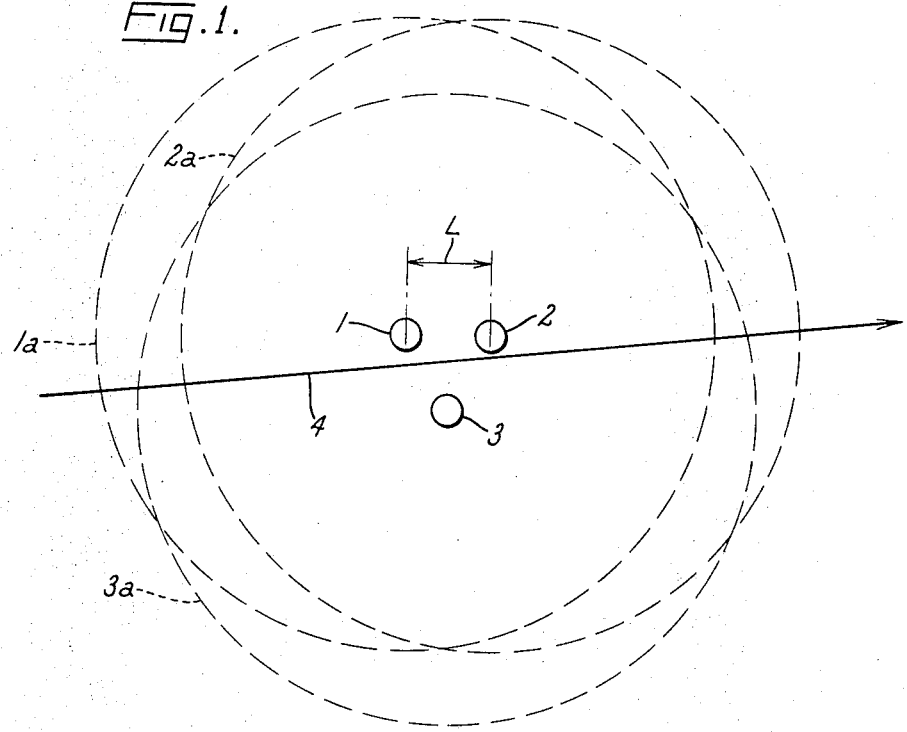
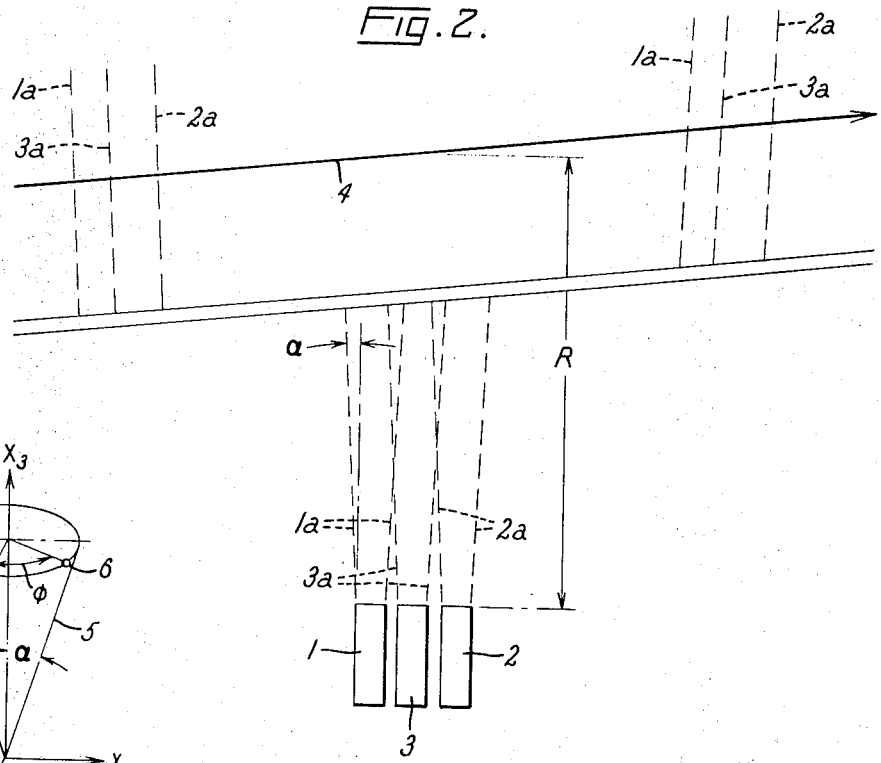
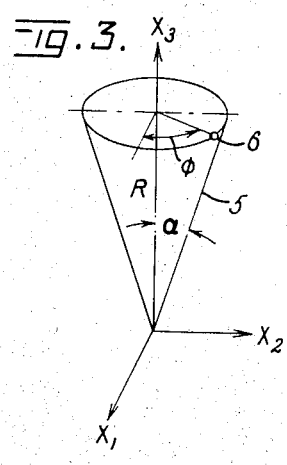
INVENTOR:
ROBERT K. SOBERMAN,
BY
AGENT

United States Patent Office 3,536,924
Patented Oct. 27, 1970

3,536,924
TRACKING DEVICE FOR MOVING WAVE
ENERGY SOURCE TO OPTICAL DETECTORS
UTILIZED TO DETERMINE RANGE AND
VECTOR VELOCITY OF A MOVING WAVE
ENERGY SOURCE
Robert K. Soberman, Philadelphia, Pa., assignor to General Electric Company, a corporation of New York
Filed Nov. 13, 1967, Ser. No. 681,996
Int. Cl. H01j 39/12
U.S. Cl. 250—208　　　　　　　　　　　　　　　1 Claim

ABSTRACT OF THE DISCLOSURE

A plurality of non-imaging, wave energy detectors, such as photodiodes, electromagnetic radiation antennas, etc., with well defined fields of reception are mounted in a passive tracking device with their field axes parallel and fields overlapping. The path, velocity and range of a wave energy reflecting or radiating body are calculated from signals generated in response to the presence of the body in the fields of reception of each of the receivers.

INTRODUCTION

This invention relates to tracking systems for moving wave energy sources of both the reflecting and radiating variety and particularly to a non-signalling, non-aiming (i.e. passive) device for tracking moving electromagnetic radiation emitting or reflecting bodies. Specifically, the present invention is directed to a device for determining the range, velocity, and direction of movement of bodies such as meteoroids, maneuvering spacecraft, etc.

BACKGROUND OF THE INVENTION

Devices for gathering data about objects moving in space have heretofore been limited to impact measurement means, earth-bound telescopes of both the optical and radio variety and signal transmission-reception systems. Most of these are fairly large and complex. With regard particularly to the study of meteoroids and micrometeoroids only the first is sufficiently simple and practical for use in space. It is limited however to the measurement of momentum. It is further limited in that physical contact with the object being studied is required and therefore only a limited amount of data can be acquired.

In the sense that all other tracking devices heretofore available have required reception of transmitted signals and/or means for tracking the object with a detector, such as by aiming the detector or using an imaging detector to determine location, all of these devices have been based on what may be termed active systems. It has not been practical to utilize any of these systems in a device sufficiently small and simple to be used for gathering data on objects moving in space.

It is therefore an object of the present invention to provide a novel means for determining position, path and velocity of moving objects.

It is a further object of this invention to provide a more simple and more practical means for tracking moving objects.

Still another object of this invention is to provide a passive device capable of determining range and vector velocity of wave energy emitting or reflecting moving objects.

One other object of this invention is to provide a practical, easily transportable device which provides a simplified means for locating and tracking objects in space.

BRIEF SUMMARY OF THE INVENTION

These and other objects are met, in accordance with the present invention, by a system which includes a plurality of non-imaging, wave energy detectors having well defined, overlapping fields of reception and generally parallel but non-coincidental field axes. Means for resolving the "raw data" from the detectors to claculate the range, velocity and/or path of the object are also provided. "Raw data" in this case refers to the strength of the signal from an object and the time period during which the object is within the field of reception of each of the detectors. In the preferred form of the invention, three optical detectors are disposed at the apexes of an equilateral triangle with their optic axes generally perpendicular to the plane defined by the apexes.

DETAILED DESCRIPTION OF THE INVENTION

While the specification concludes with the claim particularly pointing out and distinctly claiming the subject matter of the present invention, this invention may be better understood from the following description, taken in conjunction with the following drawings, in which:

FIG. 1 is a head on view of the detectors in the preferred form of the present invention;

FIG. 2 is a plan view of the detectors in the passive tracking system shown in FIG. 1; and FIG. 3 illustrates the coordinate system used in making mathematical computations for the resolution of data from the system shown in FIGS. 1 and 2.

Referring more specifically to FIG. 1, there is shown a head-on view of three optical detectors 1, 2, and 3 each disposed at one of the angles of an equilateral triangle having a side length L. The optical detectors may comprise ordinary photomultipliers or photodiodes with optical means for limiting each detector to a well defined field of vision. Such detectors provide electronic response to incident radiant energy. Typically, the optical limiting means comprises a lens system with an adjacent mask or mirror defining sharply a conical field of view with the optical detector as its apex. Also indicated in FIG. 1 are the fields of vision 1a, 2a and 3a of the respective optical detectors 1, 2 and 3 at some undefined distance from the optical detectors. In addition, the path 4 of a radiating or radiant energy reflecting object, the path, velocity (hereinafter combined as vector velocities) and range of which are to be determined, is also depicted in FIG. 1.

A plan view of the system shown in FIG. 1, is schematically illustrated in FIG. 2. The range R from the optical detectors to the object being tracked and the angle of divergence $\alpha$ of the edges of the detectors' fields of vision from the respective field axes are also indicated in FIG. 2. The angle $\alpha$, which is also the half angle of the conical fields of vision 1a, 2a and 3a need not be the same for all detectors in the system. Calculations are simplified however, if, as shown in the system depicted in FIGS. 1 and 2, $\alpha$ is the same for all detectors in the system.

For a relatively complete determination of vector velocities and range, at least three detectors, the optic axes of no more than two of which are in line with one another as one looks head-on at the system, are required. The preferred form of the invention, as shown in FIGS. 1 and 2, therefore includes three such detectors. Additional detectors may be used to improve reliability through redundancy and to reduce certain noise problems in a three detector system.

As an example of a system such as that shown in FIGS. 1 and 2, three RCA 7265 photomultipliers are combined with telescopes and mounted so that each photomultiplier-telescope combination is generally parallel with and about 4¼″ from the remaining two. The telescopes, with 17.35 centimeter focal length lenses and one inch diameter apertures 18.45 centimeters from the lenses, define conical fields of vision with half angles, $\alpha$, of 4°. A one-half inch space between the end of each of the telescopes and the respective photomultipliers is maintained to prevent excessive leakage current between the photomultipliers and the telescope barrels.

Using this system, the feasibility of the present invention has been demonstrated with a simulated moving light-reflecting body formed by the projection of a fast moving spot of light on a screen 65⅝ inches from the detectors. The screen is angled from the plane perpendicular to the system's optic axis to simulate a vector velocity parallel to the optic axis. The spot of light, produced by a lamp reflected by a small rotating mirror 5 feet from the screen, has a velocity in the plane of the screen of 25,000 inches per second. In the direction parallel to the optic axis of the detector system the simulated body has a vector velocity, $V_3$ of 4,980 inches per second. The time of entry and exit of the spot signal in the field of vision of the respective detectors was measured in one particular demonstration as follows (the first digit of the subscript represents the detector 1, 2 or 3, respectively and the second digit of the subscript entry or exit, 1 or 2, respectively):

|  | Seconds |
|---|---|
| $t_{11}$ | 0.0 |
| $t_{12}$ | $375 \times 10^{-6}$ |
| $t_{21}$ | $115 \times 10^{-6}$ |
| $t_{22}$ | $425 \times 10^{-6}$ |
| $t_{31}$ | $175 \times 10^{-6}$ |
| $t_{32}$ | $547 \times 10^{-6}$ |

This data is resolved using a coordinate system illustrated in FIG. 3 for one of the detectors. In FIG. 3 there is shown a cone of vision 5 having half angle $\alpha$. An object 6 is geometrically located with respect to a detector located at the apex of the cone of vision 5 by range R and angle of rotation $\varphi$. It may also be located using a coordinate system of mutally perpendicular axes $X_1$, $X_2$ and $X_3$. Referring to the cone of vision of detector 1, $X_2$ is the line connecting the apexes of cones of vision of detectors 1 and 2. $X_3$ is perpendicular to the plane formed by the apexes of cones of vision of detectors 1, 2 and 3, also referred to hereinafter as cones 1, 2 and 3. Similar coordinate systems for cones 2 and 3 may also be visualized with $X_1$, $X_2$ and $X_3$ for these cones being parallel to that described for cone 1.

In the mathematical analysis required for the resolution of data in the present invention the subscripts $i$, $j$ and $k$ refer to the following:

$i=1$, 2 or 3 corresponding to coordinates $X_1$, $X_2$ or $X_3$
$j=1$, 2 or 3 corresponding to cones 1, 2 or 3
$k=1$ or 2 corresponding to an entrance point 1 or an exit point 2

A set of geometric constants $C_{ij}$ are defined by

It will be recognized that $X_{ij}$ corresponds to the representative cone coordinate taxes and $\bar{X}_{ij}$ to the axes of any arbitary coordinate system having axes parallel with the cone axes. For equalateral triangular disposition of detectors with $X_{ij}$ chosen to coincide with the axes of cone 1, $$C_{11}=C_{21}=C_{31}=C_{12}=C_{32}=C_{23}=C_{33}=0 \quad (2)$$
$$C_{22}=-L \quad (3)$$
$$C_{13}=-\sqrt{3}L/2 \quad (4)$$
$$C_{23}=-L/2 \quad (5)$$

where $L=$the distance between cone apexes. Several constant are now defined:

$$d_{ij}=(C_{ij}-C_{1j})/\tan \alpha \quad (6)$$
$$h_{ij}=(t_{jk}+t_{11})/\tan \alpha \quad (7)$$
$$a=(h_{21}+h_{22}-h_{12})/h_{12} \quad (8)$$
$$b=(h_{31}+h_{32}-h_{12})/h_{12} \quad (9)$$
$$f=4h_{21}h_{22}/h_{12}^2 \quad (10)$$
$$g=4h_{21}h_{32}/h_{12}^2 \quad (11)$$
$$d=L/\tan \alpha \quad (12)$$
$$p_1=(2b-a)g+(a-b)f \quad (13)$$
$$p_2=a+b+3 \quad (14)$$
$$p_3=4/3(a^2-ab+b^2) \quad (15)$$
$$p_4=f^2-fg+g^2 \quad (16)$$
$$p_5=f+g \quad (17)$$

The range, velocity, and angle with respect to the cone can be expressed in terms of N. N is the *real, positive* root of the cubic equation $$A_3N^3+A_2N^2+A_1N+A_0=0 \quad (18)$$

where $$A_3=p_1^2/3-p_3p_4 \quad (19)$$
$$A_2=p_1^2-2/3p_1p_2p_3-2p_3p_4+p_3^2p_5 \quad (20)$$
$$A_1=p_1^2-4/3p_1p_2p_3+1/3p_2^2p_3^2$$
$$\qquad -p_3p_4+p_3^2p_5-p_3^3 \quad (21)$$
$$A_0=1/3(p_1-p_2p_3)^2 \quad (22)$$

After the value of N is determined, the vector velocities $V_i$ are $$V_1=\frac{2d}{\sqrt{3p_3}h_{12}}(2b-a)(1+N) \quad (23)$$

$$V_2=\frac{2da}{p_3h_{12}}(1+N) \quad (24)$$

$$V_3=\frac{2d}{h_{12}}\tan \alpha \sqrt{N(1+N)/p_3} \quad (25)$$

The sign of $V_3$ is the same as the sign of the quantity $$[p_2p_3-p_1(1+N)]$$

If this quantity is zero, then $V_3=0$.

Whenever $V_3$ does not equal zero, the angle $\varphi_{11}$ can be determined from $$\cos \varphi_{11}=\frac{\sqrt{3}p_3h_{12}V_3[2g-f(1+N)-p_3]}{4\tan \alpha(1+N)[p_1(1+N)-p_2p_3]} \quad (26)$$

$$\sin \varphi_{11}=\frac{3p_3h_{12}V_3[f(1+N)-p_3]}{4\tan \alpha(1+N)[p_1(1+N)-p_2p_3]} \quad (27)$$

If $V_3=0$, the value of $\tan \varphi_{11}$ can be used $$\tan \varphi_{11}=\sqrt{3}\frac{fN+f-p_3}{(2g-f)N+(2g-f-p_3)} \quad (28)$$

If $\tan \varphi_{11} \neq 0$, then $\cos \varphi$ has the same sign as $$p_3-(2g-f)(1+N) \quad (29)$$

However, if $\tan \varphi_{11}=\infty$, then $\sin \varphi_{11}$ has the opposite sign as $V_2$.

The entrance range in the first cone is $$R_{11}=\frac{-[V_1^2+V_2^2-(V_3/\tan \alpha)^2]h_{12}}{2[V_1\cos\varphi_{11}+V_2\sin\varphi_{11}-V_3/\tan\alpha]} \quad (30)$$

All other ranges are obtained from $$R_{jk}=R_{11}+V_3(t_{jk}-t_{11})+C_{3j} \quad (31)$$

The angle $\varphi_{jk}$ associated with each of these points is calculated from $$\varphi_{jk} = \arctan\left[\frac{R_{11}\tan\alpha\sin\varphi_{11}+V_2(t_{jk}-t_{11})+C_{2j}}{R_{11}\tan\alpha\cos\varphi_{11}+V_1(t_{jk}-t_{11})+C_{1j}}\right] \quad (32)$$

By letting $$X_{111} = R_{11}\tan\alpha\cos\varphi_{11} - C_{11} \quad (33)$$

$$X_{211} = R_{11}\tan\alpha\sin\varphi_{11} - C_{21} \quad (34)$$

$$X_{311} = R_{11} - C_{31} \quad (35)$$

The Cartesian coordinates, $\overline{X}_{ijk}$, are found using $$\overline{X}_{ijk} = X_{i11} + V_i(t_{jk}-t_{11}) \quad (36)$$

Utilizing the mathematical equation thus derived and the data obtained from the demonstration described above, the following information was calculated. For purposes of comparison the actual values of the calculated variables are also given along with the percent error.

TABLE I

| | Actual | Calculated | Percent error |
|---|---|---|---|
| $R_{11}$ | 70.3" | 68.2" | 3 |
| $R_{32}$ | 66.2" | 65.5" | 1 |
| $V_1^2+V_2^2$ | $2.52\times10^4$ in./sec | $2.50\times10^4$ in./sec | 0.8 |
| $V_3$ | $0.595\times10^4$ in./sec | $0.498\times10^4$ in./sec | 17 |

In addition to the information thus derived from the above system the range and brightness of the signal can then be correlated to produce a quantitative measurement of the size of the object.

There are numerous advantages of the tracking device of the present invention particularly for use in outer space. Among these are that it may be miniaturized. More importantly for purposes of tracking meteoroids and micrometeoroids, the system may be completely passive requiring no focusing or aiming or signal transmitting. Alternatively, for tracking maneuvering satellites or astronauts, a very simple signal transmitter may be used in conjunction with the present invention. In either case, the power required by this device is minimal and its initial response may be easily transmitted because it comprises simple on-off signals related only to time. Therefore although means may be provided for assimilating the data and making the necessary computations as part of the system wherever it is located, for extreme simplification the raw data may be easily transmitted for processing at some remote location such as an earth-bound receiving station.

To facilitate an understanding of this invention it has been described and schematically illustrated with the axes of the optical detectors exactly parallel to one another. Similar mathematical analyses will yield the same information even if the axes of the detectors are not exactly parallel if the degree of divergence from parallelism is known. This is important since it permits in situ calibration of the device in remote locations such as deep space. This is done by recording the response of the respective detectors of the invention to a radiating or reflecting body having a known position and path. Typically, a bright star having a distance approaching infinity from the detectors may be used for this purpose.

While the present invention has been described with reference to particular embodiments thereof for purposes of clarity and convenience, it should be understood that numerous modifications may be made by those skilled in the art without departing from the invention's true spirit and scope. Therefore the appended claim is intended to cover all such equivalent variations as come within the true spirit and scope of the present invention.

What I claim as new and desire to secure by Letters Patent of the United States is:

1. Means for determining the range and vector velocity of a moving wave energy source, said means comprising three optical detectors located approximately equidistant from each other a known distance apart, said detectors having well-defined overlapping conical fields of detection the axes of said fields being generally parallel to one another.

References Cited
UNITED STATES PATENTS

| | | | |
|---|---|---|---|
| 3,141,978 | 7/1964 | Chitayat | 250—203 |
| 3,351,756 | 11/1967 | Kallet et al. | 250—203 X |
| 3,388,629 | 6/1968 | Brenholdt et al. | 250—203 X |

RODNEY D. BENNETT, JR., Primary Examiner

M. F. HUBLER, Assistant Examiner

U.S. Cl X.R.

250—209